(12) United States Patent
Luescher (10) Patent No.: US 10,179,381 B2
(45) Date of Patent: Jan. 15, 2019

(54) INSERTION TOOL (71) Applicant: Robert Bosch GmbH, Stuttgart (DE)

(72) Inventor: Bruno Luescher, Zofingen (CH)

(73) Assignee: Robert Bosch GmbH, Stuttgart (DE)

(*) Notice: Subject to any disclaimer, the term of this patent is extended or adjusted under 35 U.S.C. 154(b) by 616 days.

(21) Appl. No.: 14/383,584

(22) PCT Filed: Jan. 15, 2013

(86) PCT No.: PCT/EP2013/050642
§ 371 (c)(1),
(2) Date: Sep. 8, 2014

(87) PCT Pub. No.: WO2013/131666
PCT Pub. Date: Sep. 12, 2013

(65) Prior Publication Data
US 2015/0107096 A1    Apr. 23, 2015

(30) Foreign Application Priority Data
Mar. 8, 2012    (DE) .................. 10 2012 004 457

(51) Int. Cl.
*B23B 31/10*    (2006.01)
*B23P 19/04*    (2006.01)
(Continued)

(52) U.S. Cl.
CPC .............. *B23P 19/04* (2013.01); *B24B 23/04* (2013.01); *B24B 27/08* (2013.01); *B24B 45/006* (2013.01);
(Continued)

(58) Field of Classification Search
CPC ......... B23B 31/10; B27B 19/006; B27B 5/32; B27B 5/30; B24B 23/04; B24B 23/02;
(Continued)

(56) References Cited

U.S. PATENT DOCUMENTS 1,861,940 A * 6/1932 Roos ...................... B24B 23/04
15/49.1
3,336,702 A * 8/1967 Enders .................... B24B 23/04
451/356
(Continued)

FOREIGN PATENT DOCUMENTS

CN      101043982 A    9/2007
CN      100460148 C    2/2009
(Continued)

OTHER PUBLICATIONS

Machine translation, "Employment tool", German patent document publication, DE 102010038508 A1 (same as WO 2012013389), Feb. 2, 2012, Fuch, R.*
(Continued)

*Primary Examiner* — Sunil K Singh
*Assistant Examiner* — Chwen-Wei Su
(74) *Attorney, Agent, or Firm* — Maginot, Moore & Beck LLP (57) ABSTRACT

An insertion tool includes at least one machining region, and at least one fastening region. The at least one fastening region is configured to couple to at least one tool holding fixture of a handheld machine tool, and has at least two fastening elements arranged substantially into a circle around a drive axis. The at least one fastening region is further configured to be at least substantially free of recesses in a radial direction within the circle.

16 Claims, 6 Drawing Sheets (51) Int. Cl.
  *B27B 19/00* (2006.01)
  *B25F 5/00* (2006.01)
  *B24B 23/04* (2006.01)
  *B24B 27/08* (2006.01)
  *B24B 45/00* (2006.01)

(52) U.S. Cl.
  CPC .............. *B25F 5/00* (2013.01); *B27B 19/006* (2013.01); *B23B 31/10* (2013.01); *Y10T 29/53* (2015.01); *Y10T 279/33* (2015.01)

(58) Field of Classification Search
  CPC . B24B 45/006; Y10T 279/33; Y10T 83/9457; Y10T 83/7045; Y10T 83/9319; B23D 61/006; B25F 3/00; B25F 5/00
  See application file for complete search history.

(56) References Cited

U.S. PATENT DOCUMENTS

| | | | | |
|---|---|---|---|---|
| 5,382,249 A | * | 1/1995 | Fletcher | A61B 17/14 606/176 |
| 5,967,886 A | * | 10/1999 | Wuensch | B24B 45/006 451/356 |
| 6,045,887 A | * | 4/2000 | Martin | B24B 23/04 428/100 |
| 2003/0176147 A1 | | 9/2003 | Krondorfer et al. | |
| 2004/0012160 A1 | * | 1/2004 | Krondorfer | B24B 45/006 279/9.1 |
| 2006/0282108 A1 | | 12/2006 | Tanner | |
| 2008/0066323 A1 | * | 3/2008 | Crain | B23D 47/12 30/388 |
| 2008/0190259 A1 | * | 8/2008 | Bohne | B24B 23/04 83/666 |
| 2009/0179368 A1 | * | 7/2009 | Haimer | B23B 31/005 269/54.2 |
| 2011/0097169 A1 | * | 4/2011 | Kazda | B23B 51/0473 408/204 |
| 2011/0266758 A1 | * | 11/2011 | Sergyeyenko | B24B 23/04 279/106 |
| 2011/0266759 A1 | | 11/2011 | Goldman | |
| 2012/0289963 A1 | * | 11/2012 | Legrand | A61B 17/14 606/79 |

FOREIGN PATENT DOCUMENTS

| | | | | |
|---|---|---|---|---|
| DE | 9309965 U1 | * | 11/1994 | ............ B24B 23/04 |
| DE | 199 14 956 A1 | | 10/2000 | |
| DE | 20 2004 021 498 U1 | | 7/2008 | |
| DE | 102012004457 A1 | * | 9/2013 | ........... B27B 19/006 |
| WO | 01/38028 A1 | | 5/2001 | |
| WO | WO 2012013389 A1 | * | 2/2012 | ........... B23D 61/006 |

OTHER PUBLICATIONS

International Search Report corresponding to PCT Application No. PCT/EP2013/050642, dated Jun. 5, 2013 (German and English language document) (6 pages).

* cited by examiner

INSERTION TOOL

This application is a 35 U.S.C. § 371 National Stage Application of PCT/EP2013/050642, filed on Jan. 15, 2013, which claims the benefit of priority to Serial No. DE 10 2012 004 457.7, filed on Mar. 8, 2012 in Germany, the disclosures of which are incorporated herein by reference in their entirety.

BACKGROUND

Some insertion tools provided for an oscillating and/or rotatory movement are known.

SUMMARY

The disclosure is based on an insertion tool, in particular handheld machine tool insertion tool, which is at least substantially provided for an oscillating and/or rotatory movement in at least one state coupled to at least one tool holding fixture, with at least one machining region and with at least one fastening region, which is at least substantially provided for coupling to the at least one tool holding fixture and in which at least two fastening elements are at least substantially arranged on a circle around a drive axis.

It is proposed that the fastening region is designed to be at least substantially free of recesses in a radial direction within the circle. A "tool holding fixture" in this context is intended to be understood as meaning, in particular, a partial region of a handheld machine tool, which partial region is at least substantially provided in order to receive and to hold the insertion tool, in particular in a releaseable manner, preferably in a manner releaseable without a tool. "Provided" is intended to be understood as meaning, in particular, specially configured, designed and/or equipped. "At least substantially" is intended to be understood as meaning, in particular, that a deviation from a predetermined value deviates in particular less than 25%, preferably less than 10% and particularly preferably less than 5% of the predetermined value.

In this context, a "machining region" is intended to be understood as meaning, in particular, a region of the insertion tool that is at least substantially provided for machining at least one workpiece. The machining region preferably comprises at least one machining contour which is formed, for example, by cutting elements, saw teeth or other elements appearing expedient to a person skilled in the art. A "fastening region" in this context is intended to be understood as meaning, in particular, a region of the insertion tool that is at least substantially provided to correspond to the tool holding fixture and to couple the insertion tool to the tool holding fixture.

In this context, "free of recesses" is intended to be understood as meaning, in particular, that a material of the insertion tool is formed continuously and without interruptions in this region. "At least substantially free of recesses" in this context is intended to be understood as meaning, in particular, that the fastening region is formed in the radial direction within the circle in particular by at least 60%, preferably by at least 75%, preferably by at least 95% and particularly preferably completely by a continuous and uninterrupted material extent.

A "radial direction" is intended to be understood as meaning, in particular, a direction which runs at least substantially along a radius of the circle and intercepts a center point of the circle.

A preferably simple, operator friendly and, in particular, tool-free coupling of the insertion tool to a corresponding tool holding fixture can be achieved by the configuration according to the disclosure. In addition, the insertion tool can be designed in such a manner that the insertion tool has an increased mass moment of inertia, in particular in comparison to already known insertion tools which have a centering fastening recess. An advantageously broad range of use of the insertion tool can thereby be achieved in a structurally simple manner.

In addition, it is proposed that the fastening region comprises at least one coding element. In this context, a "coding element" is intended to be understood as meaning, in particular, an element which is at least substantially, preferably at least substantially exclusively, provided so as preferably reliably to prevent the insertion tool from being coupled to a tool holding fixture which is unsuitable or is not intended for use with the insertion tool As a result, a preferably high degree of operator safety can be achieved, and also a high degree of abrasion, a high degree of wear and a reduction in the service life of an unsuitable handheld machine tool can advantageously be reliably prevented.

In a particularly preferred exemplary embodiment, the coding element is at least partially, preferably at least substantially completely, formed integrally with at least one basic body, in particular with the fastening region, of the insertion tool. "Integrally" is intended to be understood as meaning, in particular, connected at least in an integrally bonded manner, for example by a welding process, an adhesive bonding process, an injection molding process and/or another process appearing expedient to a person skilled in the art, and/or advantageously to be understood as meaning formed in one piece, such as, for example, by production from a cast part and/or production in a single- or multi-component injection molding method and advantageously from an individual blank. The coding element can preferably be provided for an interlocking coding. "Interlocking" here is intended to be understood as meaning, in particular, a releaseable connection, wherein a retaining force between two components is preferably transmitted between the components by a geometric engagement of the components in each other.

Furthermore, it is proposed that the fastening region is designed to be at least substantially free of fastening elements in a radial direction within the circle. In this context, "free of fastening elements" is intended to be understood as meaning, in particular, that the circle is designed in the radial direction within to be at least substantially free of elements and/or contours which are at least partially provided for a coupling to the tool holding fixture. As a result, a structurally simple and cost-effective configuration, in particular of the fastening region, of the insertion tool can be achieved.

Furthermore, it is proposed that the fastening elements are provided for a fastening in an axial direction, in a radial direction and/or in a circumferential direction. The effect which can be achieved is a structurally simple configuration of the fastening region of the insertion tool.

Furthermore, it is proposed that the fastening elements are at least partially designed as the edge of at least one fastening recess. In this context, a "fastening recess" is intended to be understood as meaning, in particular, a material weakening, and, particularly preferably, an aperture through the material of a basic body of the insertion tool, in particular of the fastening region, which material weakening is at least substantially provided for a coupling of the insertion tool to a corresponding tool holding fixture. As a result, a structurally simple, robust and cost-effective configuration of the fastening elements can be achieved.

In addition, it is proposed that the coding element is at least substantially arranged in the radial direction within the circle. As a result, a preferably compact configuration of the fastening region of the insertion tool can be achieved.

Furthermore, it is proposed that the coding element is at least substantially formed by an at least substantially plate-like material extent. A "plate-like material extent" in this context is intended to be understood as meaning, in particular, a three-dimensional element which, as viewed in a developed view in a plane, has a noncircular cross-sectional surface in a cross section perpendicular to the plane and, perpendicular to the plane, has an in particular at least substantially constant material thickness which is less than 50%, preferably less than 25%, and particularly preferably less than 10% of a surface extent of the three-dimensional element parallel to the plane, in particular of a smallest surface extent of the element parallel to the plane. As a result, a structurally simple and cost-effective configuration of the coding element can be achieved.

Furthermore, it is proposed that the insertion tool has at least one material extent which is at least substantially arranged in the radial direction outside the circle. In this context, a "material extent" is intended to be understood as meaning, in particular, a region which is at least substantially completely formed from a material, in particular a basic body of the insertion tool. As a result, a preferably stable configuration of the insertion tool and in particular of the fastening region can be achieved.

In addition, it is proposed that the fastening recesses are of at least substantially closed design. "At least substantially closed" in this context is intended to be understood as meaning, in particular, that the fastening recesses is enclosed in the plane by a material extent over an angular region of at least 180°, preferably of at least 270°, particularly preferably of at least substantially 360°. As a result, a preferably stable configuration of the fastening recesses and an advantageously secure coupling to the tool holding fixture can be achieved.

BRIEF DESCRIPTION OF THE DRAWINGS

Further advantages emerge from the description below of the drawing. The drawing illustrates three exemplary embodiments of the disclosure. The drawing, the description and the claims contain numerous features in combination. A person skilled in the art will expediently consider the features individually and put them together to form meaningful further combinations.

In the drawings.

DETAILED DESCRIPTION

Figure 1:
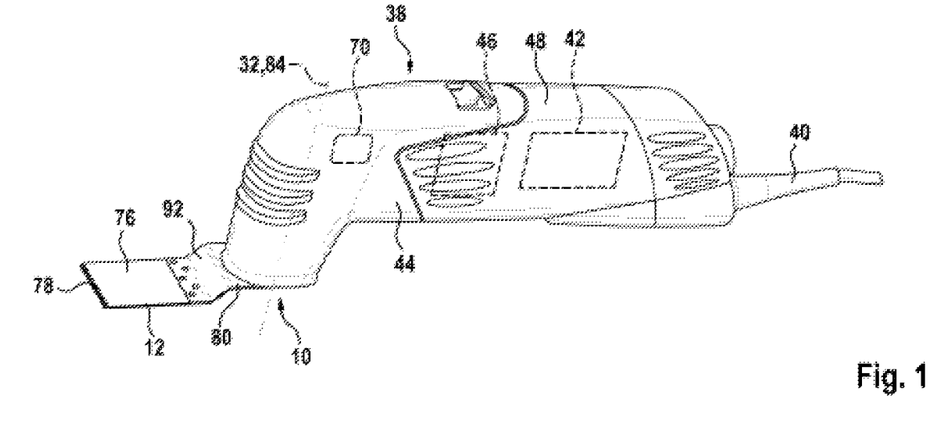
FIG. 1 shows a handheld machine tool with a tool holding fixture according to the disclosure and an insertion tool coupled thereto, in a schematic side view.

FIG. 1 illustrates a handheld machine tool 38. The handheld machine tool 38 is formed by an oscillating handheld machine tool. The handheld machine tool 38 is formed by an electrical handheld machine tool and has a power cable 40. The handheld machine tool 38 comprises a drive unit 42 which is enclosed by a housing 44 and which can be supplied with electrical voltage via the power cable 40. Furthermore, the handheld machine tool has a gearing unit 46. The gearing unit 46 is arranged between the drive unit 42 and a tool holding fixture 10. The housing 44 of the handheld machine tool 38 has a handle region 48, at which an operator can grasp the housing 44 and guide the handheld machine tool 38 in an operating state.

Figure 2:
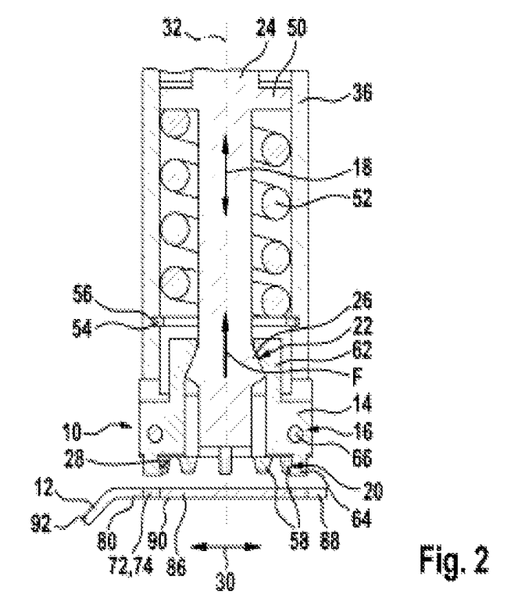
FIG. 2 shows the tool holding fixture according to the disclosure in a sectional illustration.
Figure 3:
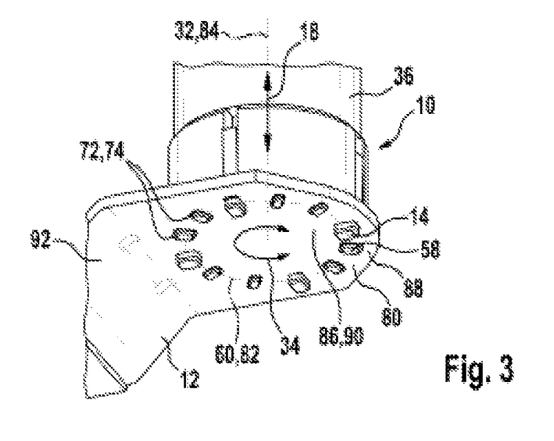
FIG. 3 shows the tool holding fixture according to the disclosure with an insertion tool coupled thereto in a perspective view.

FIG. 2 illustrates the tool holding fixture 10 of the handheld machine tool 38, the tool holding fixture being provided for an oscillating or rotatory drive of an insertion tool 12. The tool holding fixture 10 is formed by a handheld machine tool holding fixture. The handheld machine tool 38 has a drive shaft 36 which is provided for transmitting a driving movement from the drive unit 42 (not illustrated specifically) to the insertion tool 12, which is coupled to the tool holding fixture 10, in an operating state. The drive shaft 36 is of hollow-cylindrical design at an end facing the insertion tool 12. In this region, the drive shaft 36 encloses a tensioning element 24 of the tool holding fixture 10 in the circumferential direction 34. The tensioning element 24 has a supporting element 50 which extends outward in the radial direction 30 over a circumference of the tensioning element 24. A spring element 52 is supported in the axial direction 18 on the supporting element 50 of the tensioning element 24. The spring element 52 is formed by a helical spring. The spring element 52 is formed by a compression spring. At an end facing the insertion tool 12, the spring element 52 is supported on a supporting element 54 of the drive shaft 36, which is arranged radially within the drive shaft 36. The supporting element 54 is held in the axial direction 18 in a groove 56 of the drive shaft 36 and is of annular design. The spring element 52 loads the tensioning element 24, via the supporting element 50 thereof, away from the insertion tool 12 in the axial direction 18.

The tensioning element 24 has a conical region 26. The conical region 26 is arranged in the axial direction 18 in a region of the tensioning element 24 that faces away from the drive unit 42. The conical region 26 is arranged in the axial direction 18, as viewed from the drive unit 42 toward the insertion tool 12, downstream of the supporting element 54 of the drive shaft 36. The conical region 26 extends outward in the radial direction 30. A small diameter of the conical region 26 is arranged facing the drive unit 42 in the axial direction 18.

The tool holding fixture 10 has a fastening element 14 which is arranged on the holding fixture side and is provided for coupling to the insertion tool 12. The tool holding fixture 10 has four fastening elements 14 which are arranged on the holding fixture side and are provided for coupling to the insertion tool 12. Furthermore, the tool holding fixture 10 has further fastening elements 58 which are provided for transmitting a driving movement to the insertion tool 12. The fastening elements 14 are arranged on a circle 60 around a drive axis 32 of the drive shaft 36. The fastening elements 14 are arranged within the drive shaft 36 and outside the tensioning element 24, as viewed in the radial direction 30. The fastening elements 14 have a region 62 which faces the supporting element 50, and the surface of which is formed in an inclined manner relative to the drive axis 32 and thus forms a negative cone shape. The region 62 extends inward in the radial direction 30. The region 62 corresponds to the conical region 26 of the tensioning element 24. The tool holding fixture 10 has a conversion unit 22 which surrounds the conical region 26 of the tensioning element 24 and the region 62 of the fastening elements 14. The conversion unit 22 is provided for converting a movement in the axial direction 18 into a movement in a direction of the fastening elements 14 that deviates from the axial direction 18.

The fastening elements 14 have a region 64 which faces away from the supporting element 50 and is of pin-shaped design. The pin-shaped region 64 extends beyond the drive shaft 36 in the axial direction and protrudes over the drive shaft 36. In the pin-shaped region 64, the fastening elements 14 each have a conversion surface 28. The conversion surfaces 28 are formed by bevels which run tilted with respect to the axial direction 18. The conversion surfaces 28 partially form a conversion unit 20 of the tool holding fixture 10. The conversion unit 20 is provided to convert a relative movement, which partially deviates from an axial movement 18, between the insertion tool 12 and the fastening element 14 into a fastening force in the axial direction 18. The fastening force is designed as a tensioning force F in the axial direction 18. The conversion surfaces 28 of the fastening elements 14 convert the pivoting movement of the fastening elements 14, which pivoting movement has a movement component in the radial direction 30, into a force with at least one force component in the axial direction, which forms the tensioning force F. In addition, the fastening elements 14 have a central region which is arranged between the region 62 and the pin-shaped region 64 in the axial direction 18.

The tool holding fixture 10 has a bearing unit 16 which is provided for moveably supporting the fastening element 14 in a direction which partially deviates from an axial direction 18. The movement of the fastening elements 14 in a manner deviating from the axial direction 18 is provided in order to generate the tensioning force F in the axial direction 18. The fastening elements 14 are therefore mounted moveably relative to the drive shaft 36 and the tensioning element 24. The fastening elements 14 are mounted moveably in the central region. The bearing unit 16 has pin elements 66 which are provided to moveably support the fastening elements 14 in the central region. The bearing unit 16 is provided to moveably support the fastening elements 14 partially in the radial direction 30 relative to the drive axis 32. The bearing unit 16 is provided to pivotably support the fastening elements 14. It is also conceivable for the bearing unit 16 to be provided to moveably support the fastening elements 14 partially or completely in the circumferential direction 34 relative to the drive axis 32.

Figure 5:
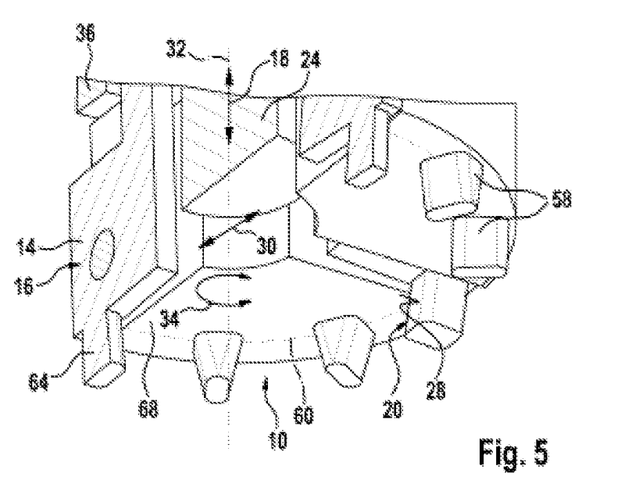
FIG. 5 shows the tool holding fixture according to the disclosure without an insertion tool coupled thereto in a perspective view.

The further fastening elements 58 of the tool holding fixture 10 are arranged at an end facing away from the drive unit 42. The tool holding fixture 10 has eight further fastening elements 58. The further fastening elements 58 are arranged on a circle 60 around the drive axis 32 of the drive shaft 36. The circles 60 on which the fastening elements 14 and the further fastening elements 58 are arranged have the same radius. The further fastening elements 58 are of conical design. The further fastening elements 58 are in each case connected to one another in pairs via ring segment elements 68 (FIG. 5). The further fastening elements 58 are fixedly connected to the ring segment elements 68. The further fastening elements 58 are connected integrally to the ring segment elements 68. The ring segment elements 68 are in each case fixedly connected to the drive shaft 36. The ring segment elements 68 are connected integrally to the drive shaft 36. The fastening elements 14 are arranged uniformly between the further fastening elements 58. The fastening elements 14 are in each case arranged between the ring segment elements 68. Overall, the tool holding fixture 10 has 12 fastening elements 14, 58.

The handheld machine tool 38 which includes the tool holding fixture 10 has an actuating element 70 (not illustrated specifically). The actuating element 70 can be designed as a lever, button or another element known to a person skilled in the art. By actuation of the actuating element 70 by an operator, the tensioning element 24 is moved away from the drive unit 42 in the axial direction 18 counter to a force of the spring element 52. As a result, the conical region 26 of the tensioning element 24 and the regions 62 of the fastening elements are guided past one another, as a result of which the fastening elements are displaced in a form-fitting manner. The fastening elements 14 thereby move into a position in which the pin-shaped regions 64 are arranged parallel to the drive axis 32. In this position, the insertion tool 12 can be pushed by an operator onto the fastening elements 14 and onto the further fastening elements 58 of the tool holding fixture 10 in the axial direction 18 (FIG. 2). The fastening elements 14 and the further fastening elements 58 reach through corresponding fastening elements 74 of the insertion tool 12, which fastening elements are formed by fastening recesses 72.

Figure 4A:
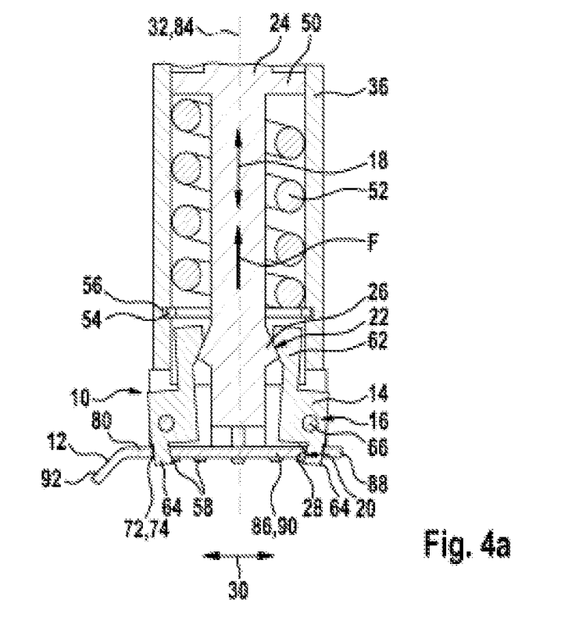
FIG. 4a shows the tool holding fixture according to the disclosure with an insertion tool coupled thereto in a sectional illustration.
Figure 4B:
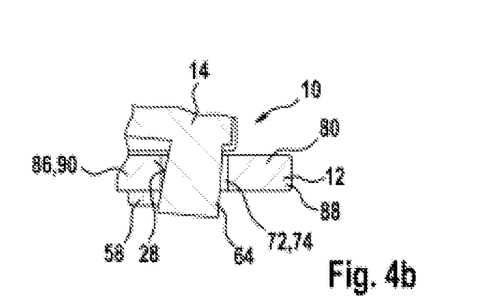
FIG. 4b shows a detail of the tool holding fixture according to the disclosure in a schematic sectional illustration.

By the operator releasing or letting go of the actuating element 70, the tensioning element 24 is automatically moved in the axial direction 18 toward the drive unit 42 by the force of the spring element 52. As a result, the conical region 26 of the tensioning element 24 and the regions 62 of the fastening elements 14 are guided past one another and press the regions 62 of the fastening elements 14 outward in the radial direction 30 (FIG. 4a). The pin-shaped regions 64 of the fastening elements 14 thereby move inward in the radial direction 30 (FIGS. 3, 4a, 4b and 7). In a mounted state of the insertion tool 12 on the tool holding fixture 10, the insertion tool 12 is braced in the axial direction 18 against the tool holding fixture 18 by the pivoting movement of the fastening elements 14 and is held captively. The pivoting movement of the fastening elements 14 brings about a tensioning force F in the axial direction 18 on the insertion tool 12. As a result, the insertion tool 12 is pressed toward the tool holding fixture 10 and moves in the axial direction 10 along the further conical fastening elements 58. In a completely braced state of the insertion tool 12 in the tool holding fixture 10, the further fastening elements 58 bear in the radial direction 30 and in the circumferential direction 34 against the fastening recesses 72 of the insertion tool 12. The further fastening elements 58 thereby secure the insertion tool 12 in the radial direction 30 and in the circumferential direction 34 in a manner free of rotational play. The fastening elements 14 and the further fastening elements 58 have a rectangular cross section, the corners of which are of rounded design, perpendicular to the axial direction 18.

Figure 6:
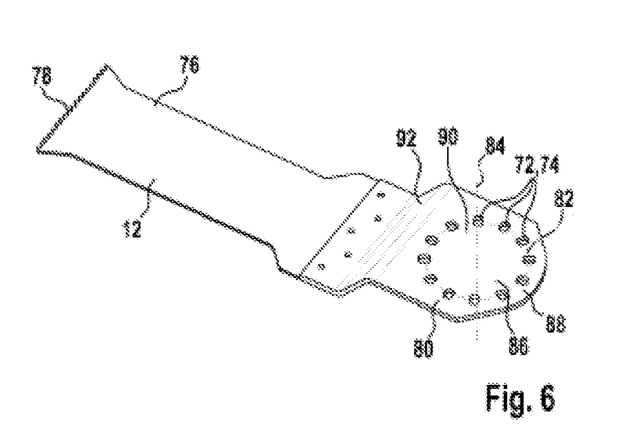
FIG. 6 shows the insertion tool in a perspective illustration.
Figure 7:
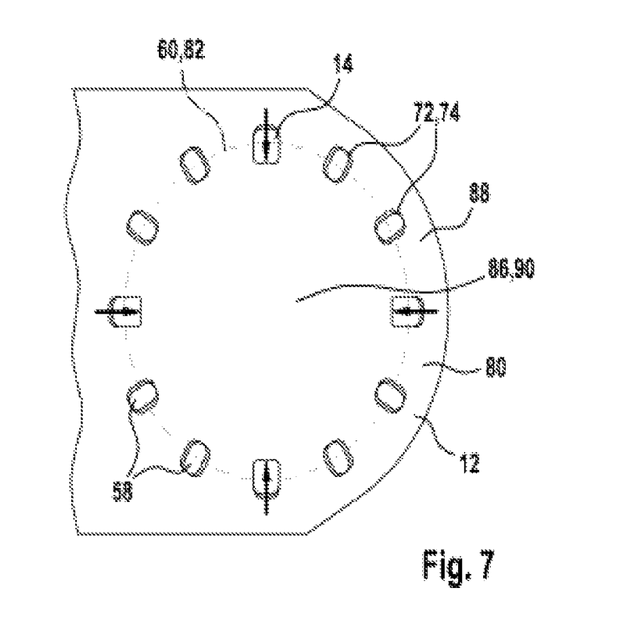
FIG. 7 shows a detail of the insertion tool in a top view.

The insertion tool 12 is formed by a handheld machine tool insertion tool (FIG. 6). In a state coupled to the tool holding fixture 10, the insertion tool 12 is provided for a rotatory or oscillating movement. The insertion tool 12 has a machining region 76 which has a machining contour 78, such as, for example, cutting elements, saw teeth or another configuration appearing expedient to a person skilled in the art. In addition, the insertion tool 12 has a fastening region 80 which has the fastening elements 74 formed by the fastening recesses 72. The machining region 76 and the fastening region 80 extend in two planes, which are spaced apart from each other in the axial direction 18 and run parallel to each other, and are connected to each other via an insertion tool region 92 running obliquely with respect to the planes. The fastening elements 14 are arranged on a circle 82 around a drive axis 84 of the insertion tool 12. The fastening region 80 is designed to be free of recesses within the fastening elements 74, as viewed in the radial direction 30. As viewed in the radial direction 30, a material extent 86 is arranged within the fastening elements 74, which are arranged in a circular manner. The material extent 86 is of continuous, i.e. uninterrupted, design. The fastening region 80 is of plate-like design radially within the fastening recesses 72.

In the radial direction 30, the fastening elements 74 are partially enclosed by a further material extent 88. In the radial direction 30, the fastening elements 74 are completely enclosed by the further material extent 88. That is to say, the fastening elements 74 are of closed design in a main plane of extent of the insertion tool 12. The fastening elements 74 have a rectangular cross section, the corners of which are of rounded design, perpendicular to the axial direction 18. The insertion tool 12 has a total of 12 fastening elements 74 formed by the fastening recesses 72.

The fastening region 80 of the insertion tool 12 has a coding element 90. The coding element 90 is formed by the material extent 86. The coding element 90 is provided to prevent coupling of the insertion tool 12 to a tool holding fixture (not illustrated) of an unsuitable handheld machine tool. In particular, oscillating handheld machine tools which are already known and are not illustrated have a drive shaft which, in a coupled state, extends in the axial direction 18 beyond the fastening region 80 of the insertion tool 12. For this purpose, oscillating insertion tools which are already known and are not illustrated have, in addition to the fastening recesses arranged in a circular manner, a centering recess which is formed coaxially with respect to the drive axis 84. It is also conceivable for the coding element to comprise a profiling or an elevation.

In particular because of the material extent 86, the insertion tool 12 has a greater mass moment of inertia than the oscillating insertion tools which are already known and are not illustrated. A drive unit and a gearing unit of oscillating handheld machine tools which are already known and are not illustrated are not provided for said greater mass moment of inertia, and therefore, when the insertion tool 12 is coupled to and used with one of the oscillating handheld machine tools which are already known and are not illustrated, increased wear and a reduction in the service life of the oscillating handheld machine tool may occur. By means of the coding element 90 formed by the material extent 86, coupling of the insertion tool 12 to an oscillating handheld machine tool which is already known and is not illustrated is reliably prevented.

The description below and the drawings of the further exemplary embodiments are restricted essentially to the differences between the exemplary embodiments, wherein reference can in principle also be made with respect to identically denoted components, in particular with regard to components with the same reference numbers, to the drawings and/or the description of the first exemplary embodiment. In order to differentiate the exemplary embodiments, the reference numbers of the further exemplary embodiments are preceded by the numbers 1 to 2.

Figure 8:
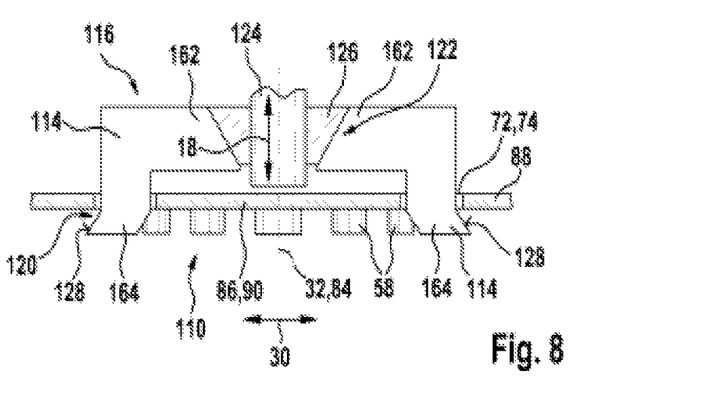
FIG. 8 shows a detail of a tool holding fixture in a schematic sectional illustration.

FIG. 8 illustrates a detail of a tool holding fixture 110. The tool holding fixture 110 has a fastening element 114 which is arranged on the holding fixture side and is provided for coupling to the insertion tool 12. The tool holding fixture 110 has four fastening elements 114 which are arranged on the holding fixture side and are provided for coupling to the insertion tool 12. The fastening elements 114 at least substantially correspond to the fastening elements 14 which have already been described.

The tool holding fixture 110 has a bearing unit 116 (not illustrated specifically) which is provided for supporting the fastening elements 114 displaceably perpendicularly to the axial direction 18. The bearing unit 116 comprises a linear plain bearing. The bearing unit 116 is provided to moveably support the fastening elements 114 in the radial direction 30. The tool holding fixture 110 has a tensioning element 124 which extends parallel to the axial direction 18. The tensioning element 124 has a conical region 126. The conical region 126 is arranged in the axial direction 18 in a region of the tensioning element 124 that faces away from the drive unit 42. The conical region 126 extends outward in the radial direction 30. A larger diameter of the conical region 126 is arranged facing the drive unit 42 in the axial direction 18.

The fastening elements 114 have a region 162 which faces the drive unit 42 in the axial direction 18, and the surface of which is formed in an inclined manner relative to the drive axis 32 and thus forms a negative cone shape. The region 162 extends inward in the radial direction 30. The region 162 corresponds to the conical region 126 of the tensioning element 124. The tool holding fixture 110 has a conversion unit 122 which surrounds the conical region 126 of the tensioning element 124 and the region 162 of the fastening elements 114. The conversion unit 122 is provided for converting a movement in the axial direction 18 into a movement in a direction of the fastening elements 114 that deviates from the axial direction 18. The conversion unit 122 is provided for converting a movement in the axial direction 18 into a movement of the fastening elements 114 in the radial direction 30.

The fastening elements 114 have a region 164 which faces away from the region 162 and is of pin-shaped design. The pin-shaped region 164 extends beyond the drive shaft 36 in the axial direction 18 and protrudes over the drive shaft 36 in the axial direction 18. In the pin-shaped region 164, the fastening elements 114 each have a conversion surface 128. The conversion surfaces 128 are formed by bevels which run in a tilted manner with respect to the axial direction 18. The conversion surfaces 128 partially form a conversion unit 120 of the tool holding fixture 110. The conversion unit 120 is provided to convert a relative movement, which completely deviates from an axial movement, between the insertion tool 12 and the fastening element 114 into a tensioning force F in the axial direction 18. The conversion unit 120 is provided to convert the relative movement in the radial direction 30 between the insertion tool 12 and the fastening element 114 into a tensioning force F in the axial direction 18.

The further fastening elements 58 of the tool holding fixture 110 are arranged at an end facing away from the drive unit 42. The tool holding fixture 110 has eight further fastening elements 58. The further fastening elements 58 are arranged on a circle 60 around the drive axis 32 of the drive shaft 36. The fastening elements 114 and the further fastening elements 58 are arranged on the same circle 60 with the same radius. The further fastening elements 58 are of conical design.

In a mounted state of the insertion tool 12 on the tool holding fixture 110, the insertion tool 12 is braced in the axial direction 18 against the tool holding fixture 110 by the fastening elements 114, by the movement of the fastening elements 114 outward in the radial direction 30, and is held captively. The movement of the fastening elements 114 outward in the radial direction 30 brings about a tensioning force F in the axial direction 18 on the insertion tool 12. As a result, the insertion tool 12 is pressed toward the tool holding fixture 110 and moves in the axial direction 18 along the further conical fastening elements 58. In a completely braced state of the insertion tool 12 in the tool holding fixture 110, the further fastening elements 58 bear in the radial direction 30 and in the circumferential direction 34 against the fastening elements 74 of the insertion tool 12, which fastening elements are formed by the fastening recesses 72. The further fastening elements 58 thereby secure the insertion tool 12 in the radial direction 30 and in the circumferential direction 34. The fastening elements 114 and the further fastening elements 58 have a rectangular cross section, the corners of which are of rounded design.

Figure 9:
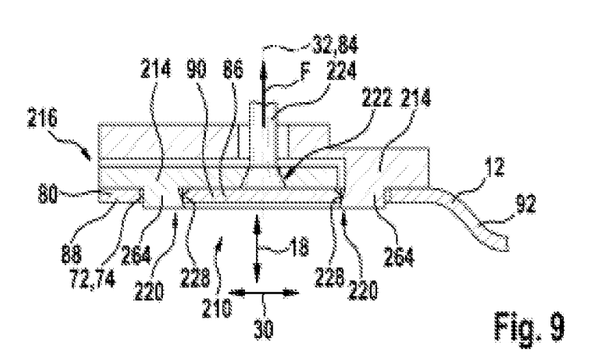
FIG. 9 shows a detail of an alternative tool holding fixture in a schematic sectional illustration.

FIG. 9 illustrates a detail of an alternatively configured tool holding fixture 210. The tool holding fixture 210 has a fastening element 214 which is arranged on the holding fixture side and is provided for coupling to the insertion tool 12. The tool holding fixture 210 has a total of four fastening elements 214 which are arranged on the holding fixture side and are provided for coupling to the insertion tool 12. The fastening elements 214 at least substantially correspond to the fastening elements 14 which have already been described.

The tool holding fixture 210 has a bearing unit 216 (not illustrated specifically) which is provided for supporting the fastening elements 214 displaceably perpendicularly to the axial direction 18. The bearing unit 216 comprises a linear plain bearing. The bearing unit 216 is provided to support the fastening elements 214 moveably in the radial direction 30. The tool holding fixture 210 has a tensioning element 224 (not illustrated specifically) which extends parallel to the axial direction 18.

The tool holding fixture 210 has a conversion unit 222 which comprises a conversion contour. The conversion unit 222 is provided for converting a movement in the axial direction 18 into a movement in a direction of the fastening elements 214 that deviates from the axial direction 18. The conversion unit 222 is provided for converting a movement in the axial direction 18 into a movement of the fastening elements 214 in the radial direction 30.

The fastening elements 214 have a region 264 which is of pin-shaped design. The pin-shaped region 264 extends beyond the drive shaft 36 in the axial direction 18 and protrudes over the drive shaft 36 in the axial direction 18. In the pin-shaped region 264, the fastening elements 214 each have a conversion surface 228. The conversion surfaces 228 are formed by bevels which run in a tilted manner with respect to the axial direction 18. The conversion surfaces 228 partially form a conversion unit 220 of the tool holding fixture 210. The conversion unit 220 is provided for converting a relative movement, which deviates completely from an axial movement, between the insertion tool 12 and the fastening element 214 into a tensioning force F in the axial direction 18. The conversion unit 220 is provided for converting the relative movement in the radial direction 30 between the insertion tool 12 and the fastening element 214 into a tensioning force F in the axial direction 18.

In a mounted state of the insertion tool 12 on the tool holding fixture 210, the insertion tool 12 is braced in the axial direction 18 against the tool holding fixture 210 by the fastening elements 214, by movement of the fastening elements 214 inward in the radial direction 30, and is held captively. The movement of the fastening elements 214 inward in the radial direction brings about a tensioning force F in the axial direction 18 on the insertion tool 12. As a result, the insertion tool 12 is pressed toward the tool holding fixture 210 and moves in the axial direction 18 along further, conical fastening elements 58. In a completely braced state of the insertion tool 12 in the tool holding fixture 210, the further fastening elements 58 bear in the radial direction 30 and in the circumferential direction 34 against the fastening elements 74 of the insertion tool 12, which fastening elements are formed by the fastening recesses 72. The further fastening elements 58 thereby secure the insertion tool 12 in the radial direction 30 and in the circumferential direction 34. The fastening elements 214 and the further fastening elements 58 have a rectangular cross section, the corners of which are of rounded design.

It is also conceivable for the fastening elements 14, 114, 214 to be designed to be pivotable outward in the radial direction 30 or to be displaceable in the circumferential direction or tangentially and to thereby bring about a fastening force, which is formed by a tensioning force F, on the insertion tool 12 in the axial direction 18.

The invention claimed is:

1. An insertion tool comprising:
   at least one machining region; and
   at least one fastening region configured to couple to at least one tool holding fixture of a handheld machine tool and including at least two fastening elements arranged substantially into a circle around a drive axis,
   wherein the at least one fastening region is further configured to be at least substantially free of recesses in a radial direction within the circle; and
   wherein the at least one fastening region is further configured to be completely free of fastening recesses within the circle.

2. The insertion tool as claimed in claim 1, wherein the at least one fastening region further includes at least one coding element.

3. The insertion tool at least as claimed in claim 2, wherein the coding element is at least substantially arranged in the radial direction within the circle.

4. The insertion tool at least as claimed in claim 2, wherein the coding element is at least substantially formed by an at least substantially plate-like material extent.

5. The insertion tool as claimed in claim 2, wherein the coding element is configured to prevent the insertion tool from being coupled to a tool holding fixture that does not correspond with the coding element.

6. The insertion tool as claimed in claim 1, wherein the at least one fastening region is configured to be free of fastening elements in a radial direction within the circle.

7. The insertion tool as claimed in claim 1, wherein the at least two fastening elements are configured to fasten the insertion tool in at least one of: (i) an axial direction; (ii) a radial direction; and (iii) a circumferential direction.

8. The insertion tool as claimed in claim 1, wherein the at least two fastening elements are configured at least partially as an edge of at least one fastening recess.

9. The insertion tool at least as claimed in claim 8, wherein the at least one fastening recess is at least substantially enclosed by at least one material extent.

10. The insertion tool as claimed in claim 1, wherein the at least one fastening region includes at least one material extent at least substantially located in the radial direction outside the circle.

11. The insertion tool as claimed in claim 1, wherein the insertion tool is configured as a handheld machine tool insertion tool.

12. The insertion tool as claimed in claim 1, wherein the at least one fastening region is configured to couple to the at least one tool holding fixture such that the insertion tool is configured for at least one of oscillating movement and rotatory movement.

13. The insertion tool as claimed in claim 1, wherein the fastening region is free of a centering recess configured to center the insertion tool relative to the at least one tool holding fixture.

14. A handheld machine tool, comprising:
a tool holding fixture; and
at least one insertion tool including: (i) at least one machining region; and (ii) at least one fastening region configured to couple to the tool holding fixture and having at least two fastening elements arranged substantially into a circle around a drive axis,
wherein the at least one fastening region is further configured to be completely free of recesses in a radial direction within the circle.

15. A system, comprising:
at least one handheld machine tool including at least one tool holding fixture; and
at least one insertion tool including: (i) at least one machining region; and (ii) at least one fastening region configured to couple to the at least one tool holding fixture and having at least two fastening elements arranged substantially into a circle around a drive axis,
wherein the at least one fastening region is further configured to be completely free of fastening recesses within the circle.

16. An insertion tool, comprising:
at least one machining region; and
at least one fastening region configured to couple to a tool holding fixture, and having at least two fastening elements arranged substantially into a circle around a drive axis,
wherein the at least one fastening region is further configured to be completely free of recesses in a radial direction within the circle.

* * * * *